(12) United States Patent
Saito

(10) Patent No.: US 8,124,552 B2
(45) Date of Patent: Feb. 28, 2012

(54) OPTICAL GLASS

(75) Inventor: Motoaki Saito, Saitama (JP)

(73) Assignee: Fujifilm Corporation, Tokyo (JP)

( * ) Notice: Subject to any disclaimer, the term of this patent is extended or adjusted under 35 U.S.C. 154(b) by 143 days.

(21) Appl. No.: 12/749,014

(22) Filed: Mar. 29, 2010

(65) Prior Publication Data

US 2010/0261598 A1 Oct. 14, 2010

(30) Foreign Application Priority Data

Apr. 14, 2009 (JP) ................................ P2009-097578

(51) Int. Cl.
 *C03C 3/066* (2006.01)
 *C03C 3/068* (2006.01)
(52) U.S. Cl. ........................................... 501/78; 501/79
(58) Field of Classification Search .................... 501/78, 501/79
See application file for complete search history.

(56) References Cited

U.S. PATENT DOCUMENTS

| | | | |
|---|---|---|---|
| 2004/0220041 A1 | 11/2004 | Isowaki et al. | |
| 2005/0049135 A1 | 3/2005 | Hayashi | |
| 2005/0204776 A1 | 9/2005 | Hayashi | |
| 2005/0272589 A1 | 12/2005 | Shimizu | |
| 2008/0220961 A1 | 9/2008 | Uehara et al. | |
| 2008/0287280 A1* | 11/2008 | Onoda et al. | 501/78 |
| 2009/0093357 A1* | 4/2009 | Sasai et al. | 501/78 |
| 2009/0149307 A1 | 6/2009 | Shimizu | |
| 2010/0240516 A1* | 9/2010 | Tomeno et al. | 501/78 |
| 2010/0304950 A1* | 12/2010 | Tomeno et al. | 501/78 |

FOREIGN PATENT DOCUMENTS

| | | |
|---|---|---|
| EP | 1 604 959 A1 | 12/2005 |
| JP | 60-221338 A | 11/1985 |
| JP | 2004-175632 A | 6/2004 |
| JP | 2005-97102 A | 4/2005 |
| JP | 2005-263570 A | 9/2005 |
| JP | 2006-16293 A | 1/2006 |
| JP | 2006-16295 A | 1/2006 |
| JP | 2008-105863 A | 5/2008 |

* cited by examiner

*Primary Examiner* — Karl Group
(74) *Attorney, Agent, or Firm* — Birch, Stewart, Kolasch & Birch, LLP

(57) ABSTRACT

An optical glass includes, by weight: 1% or more and 5% or less of silicon oxide ($SiO_2$); 15% or more and 24% or less of boron oxide ($B_2O_3$); 0.1% or more and 3% or less of aluminum oxide ($Al_2O_3$); 1% or more and 14% or less of zinc oxide (ZnO); 35% or more and 45% or less of lanthanum oxide ($La_2O_3$); 5% or more and 10% or less of yttrium oxide ($Y_2O_3$); 5% or more and 13% or less of tantalum oxide ($Ta_2O_5$); and 0.5% or more and 3% or less of lithium oxide ($Li_2O$).

5 Claims, No Drawings

US 8,124,552 B2

OPTICAL GLASS

CROSS-REFERENCE TO RELATED APPLICATIONS

This application is based on and claims priority under 35 USC 119 from Japanese Patent Application No. 2009-097578 filed Apr. 14, 2009; the entire contents of which are incorporated herein by reference.

BACKGROUND

1. Technical Field

The present invention relates to an optical glass suitable for a high-precision press molding at a relatively low temperature.

2. Related Art

In recent years, digital cameras or mobile phones equipped with a camera capable of taking image information by using an image pickup device such as a CCD (Charge Coupled Device) or a CMOS (Complementary Metal Oxide Semiconductor) have spread-rapidly. In particular, recently, as image pickup devices having a large number of pixels are developed in order to achieve high image quality, a demand for high optical performance in an imaging lens has become stronger. On the other hand, a demand for a decrease in size has also become stronger.

In order to cope with the demands, usually, molded lenses made of glass press-molded by a mold having a precisely accurate size are employed as the imaging lens. By using the press molding as compared with grinding processing, it is possible to manufacture easily and efficiently an optical lens having an aspheric surface and an optical lens having a micro size.

However, since such press molding is performed at a high temperature equal to or more than a deformation temperature of an optical glass as a raw material, high durability is required for the mold to which physical load such as heat or stress is applied. As the deformation temperature of the optical glass increases, the physical load applied to the mold increases. Accordingly, in order to increase lifetime of the mold, suppressing the deformation temperature of the optical glass as low as possible is required.

On the other hand, in order to decrease a size of the imaging lens and increase an angle of view of the imaging lens, an optical glass having a high refractive index or a low dispersivity is also strongly demanded.

There are developed several optical glasses having a high refractive index, a low dispersivity, and a relatively low deformation temperature (and a glass transition temperature) (for example, refer to Patent Document 1 (JP-A-2005-263570 corresponding to US-A-2005/0204776), Patent Document 2 (JP-A-2005-97102 corresponding to US-A-2005/0049135), Patent Document 3 (JP-A-2006-16293 corresponding to US-A-2005/0272589, US-A-2009/0149307 and US-A-2008/0220961), Patent Document 4 (JP-A-2006-16295 corresponding to US-A-2005/0272589, US-A-2009/0149307 and US-A-2008/0220961), Patent Document 5 (JP-A-2008-105863), or Patent Document 6 (JP-A-2004-175632 corresponding to US-A-2004/0220041)). The optical glasses disclosed in Patent Documents 1 to 6 includes silicon oxide ($SiO_2$), boron oxide ($B_2O_3$), lanthanum oxide ($La_2O_3$), gadolinium oxide ($Gd_2O_3$), and zinc oxide (ZnO).

However, recently, a decrease in size of the imaging lens and an increase in performance are remarkable, and thus there have been additional demands for an increase in refractive index of the optical glass, a decrease in dispersivity of the optical glass, and processability.

SUMMARY

An object of the invention is to provide an optical glass having a higher refractive index, a lower dispersivity, and a better formability.

According to an aspect of the invention, an optical glass includes: 1 wt % or more and 5 wt % or less of $SiO_2$; 15 wt % or more and 24 wt % or less of $B_2O_3$; 0.1 wt % or more and 3 wt % or less of $Al_2O_3$; 1 wt % or more and 14 wt % or less of ZnO; 35 wt % or more and 45 wt % or less of $La_2O_3$; 5 wt % or more and 10 wt % or less of $Y_2O_3$; 5 wt % or more and 13 wt % or less of $Ta_2O_5$; and 0.5 wt % or more and 3 wt % or less of $Li_2O$.

The optical glass according to the aspect of the invention includes various material having predetermined relative proportions. Therefore, it is possible to secure a high refractive index and a low dispersivity, and it is easy to stabilize a glass state (for example, a problem in that glass is fogged at the time of press molding hardly arises).

In the aspect of the invention, it is preferable that the optical glass includes at least one of $ZrO_2$, $Nb_2O_5$, $WO_3$, $Na_2O$, $K_2O$, and $Sb_2O_3$. In this case, it is preferable that a content of $ZrO_2$ should be 0 wt % or more and 10 wt % or less, a content of $Nb_2O_5$ should be 0 wt % or more and 10 wt % or less, a content of $WO_3$ should be 0 wt % or more and 5 wt % or less, a content of $Na_2O$ should be 0 wt % or more and 3 wt % or less, a content of $K_2O$ should be 0 wt % or more and 3 wt % or less, and a content of $Sb_2O_3$ should be 0 wt % or more and 1 wt % or less. When the optical glass includes the materials, it is preferable to satisfy the following Conditional Expression (1). Here, A denotes a total content (wt %) of $La_2O_3$ and $Y_2O_3$, and B denotes a total content (wt %) of $ZrO_2$, $Nb_2O_5$, $Ta_2O_5$ and $WO_3$.

$$1.7 < A/B < 2.6 \tag{1}$$

According to the aspect of the invention, the optical glass is configured to include $B_2O_3$ and $La_2O_3$ as main components and also include $Al_2O_3$. Therefore, it is possible to improve a refractive index characteristic and a dispersion characteristic, and it is also possible to decrease a deformation temperature (and a glass transition temperature). For example, it is possible to suppress the glass transition temperature up to a temperature less than 640° C. while securing a refractive index more than 1.83 and an Abbe number more than 37 at the d-line. Such an optical glass enables molding at relatively low temperature, and thus is suitable for mass production of a molded lens having a small size and high optical performance. Further, the optical glass according to the aspect of the invention does not include environmental toxins such as arsenic (As), lead (Pb), and tellurium (Ter used in the past. Hence, this configuration is preferable from the viewpoint of environment preservation.

DETAILED DESCRIPTION

Hereinafter, an exemplary embodiment of the invention will be described in detail.

The optical glass according to the embodiment of the invention is suitable for an imaging lens mounted on, for example, a digital still camera, a silver salt camera, a module camera for a mobile phone, or the like.

The optical glass includes components of silicon oxide ($SiO_2$), boron oxide ($B_2O_3$), aluminum oxide ($Al_2O_3$), zinc oxide (ZnO), lanthanum oxide ($La_2O_3$), yttrium oxide ($Y_2O_3$), tantalum oxide ($Ta_2O_5$), lithium oxide ($Li_2O$).

In the components, $SiO_2$ is a component for forming a structure of the optical glass, and its content is 1 wt % or more and 5 wt % or less. By adding 1 wt % or more of $SiO_2$ to the optical glass, a glass structure is stabilized in a molding temperature range (a temperature range from a deformation temperature Ts to a degree larger by 50° C. than the deformation temperature), and thus crystallization is suppressed. By setting the content of $SiO_2$ to 5 wt % or less, solubility of the optical glass is satisfactorily kept.

$B_2O_3$ is a main component for forming a structure of the optical glass. By setting the content of $B_2O_3$ to 15 wt % or more of the total composition, the structure of the optical glass is stabilized. In addition, by setting the content to 24 wt % or less, it becomes easy to achieve a high refractive index (corresponding to a refractive index nd more than 1.83 at the d-line).

$Al_2O_3$ is a component for improving stability of a glass state. That is, by increasing viscosity of the optical glass and reducing a growth rate of crystal, the component has a function of improving devitrification resistance. By setting the content of $Al_2O_3$ to 0.1 wt % or more and 3 wt % or less of the total composition, it is possible to exhibit the above-mentioned function effectively. If the content thereof is more than 3 wt %, devitrification tends to occur more easily.

ZnO exhibits a function of improving solubility of the optical glass. It is preferable that the content of ZnO should be 1 wt % or more and 14 wt % or less of the total composition. By setting the content to 1 wt % or more, it is possible to improve solubility. Further, by setting the content to 14 wt % or less, it becomes easy to achieve a high refractive index (corresponding to a refractive index nd more than 1.83 at the d-line).

$La_2O_3$ is a component for producing an effect to increase the refractive index of the optical glass and to decrease dispersion (that is, to increase an Abbe number). By setting the content of $La_2O_3$ to 35 wt % or more, it is possible to exhibit the effect sufficiently. However, if $La_2O_3$ is added too much, it is difficult to make the glass transition temperature Tg be 640° C. or less. Therefore, it is preferable that the content thereof should be 45 wt % or less of the total composition.

$Y_2O_3$ is also a component for increasing the refractive index thereof glass and decreasing dispersion (that is, increasing an Abbe number). By setting the content of $Y_2O_3$ to 5 wt % or more, it is possible to exhibit the effect sufficiently. However, if $Y_2O_3$ is added too much, devitrification tends to occur. Therefore, it is preferable that the content thereof should be 10 wt % or less of the total composition.

$Ta_2O_5$ is a component for increasing the refractive index. It is also expected that $Ta_2O_5$ has an effect to prevent devitrification. However, if $Ta_2O_5$ is added too much, devitrification tends to occur. Therefore, it is preferable that the content thereof should be 5 wt % or more and 13 wt % or less.

$Li_2O$ is a component for mainly producing an effect to decrease the glass transition temperature Tg. However, if $Li_2O$ is added too much, deterioration in refractive index and deterioration in glass stability are caused. Therefore, it is preferable that the content thereof should be 0.5 wt % or more and 3 wt % or less.

The optical glass may further include at least one of the following optional components: zirconium oxide ($ZrO_2$); niobium oxide ($Nb_2O_5$); tungsten oxide ($WO_3$); sodium oxide ($Na_2O$); potassium oxide ($K_2O$); and antimony oxide ($Sb_2O_3$).

$ZrO_2$ is a component for further improving the refractive index. However, if $ZrO_2$ is added too much, deterioration in glass stability is caused. Therefore, it is preferable that the content thereof should be 0 wt % or more and 10 wt % or less.

$Nb_2O_5$ is an effective component for obtaining a high refractive index. By setting the content of $Nb_2O_5$ to 5 wt % or less of the total composition, it is easy to obtain favorable solubility.

$WO_3$ is also an effective component for obtaining a high refractive index. By setting the content of $WO_3$ to 5 wt % or less of the total composition, it is easy to obtain favorable solubility.

$Na_2O$ and $K_2O$ are, similarly to $Li_2O$, components for mainly producing an effect to decrease the glass transition temperature Tg. However, if those are added too much, deterioration in glass stability is caused. Therefore, it is preferable that the contents of $Na_2O$ and $K_2O$ should be 0 wt % or more and 3 wt % or less, respectively.

$Sb_2O_3$ is a component for having a defoaming effect and a decoloring effect. It is preferable that the content of $Sb_2O_3$ should be 0 wt % or more and 1 wt % or less.

In the optical glass, it is preferable to satisfy the following Conditional Expression (1). Here, A denotes a total content (wt %) of $La_2O_3$ and $Y_2O_3$, and B denotes a total content (wt %) of $ZrO_2$, $Nb_2O_5$, $Ta_2O_5$ and $WO_3$.

$$1.7 < A/B < 2.6 \quad (1)$$

By satisfying Conditional Expression (1), it is possible to suppress the glass transition temperature Tg and the deformation temperature Ts up to smaller temperature, and it is possible to obtain a higher refractive index and a lower dispersivity. In Conditional Expression (1), if A/B is 1.7 or less, the Abbe number decreases (the dispersivity increases). In addition, if A/B is 2.6 or more, the refractive index tends to decrease.

For example, the optical glass can be manufactured as follows. Specifically, first, raw material powders of the above-mentioned components are mixed in a predetermined proportion, thereby obtaining a mixed raw material. Next, the mixed raw material is put in a melting pot which is heated to be substantially in the range of 1100° C. to 1350° C., and is sequentially melted while the temperature of the melting pot is maintained (a melting process). Then, the melted mixed raw material is stirred for a predetermined time while the temperature of the melting pot is maintained (a stirring process), and subsequently a standing state is continued for a predetermined time, thereby removing foam (a clarification process). Finally, the material flows out from the melting pot in a state where the temperature of the melting pot is maintained, flows in a mold which is previously heated to a predetermined temperature, and is gradually cooled, thereby obtaining the optical glass according to the embodiment.

Furthermore, in a case where a lens is formed by using the optical glass, the forming procedure is as follows. First, the optical glass is processed to have a desired size and a desired shape in accordance with a size and a shape of an optical element to be formed, thereby forming a preform. Next, the preform is inserted into a mold which is processed with high precision so as to have a desired shape, and press-molding is performed thereon. At this time, both the mold and the preform are heated up to the deformation temperature of the preform and are then pressed, and are cooled down up to the glass transition temperature or less while the pressed state is maintained. After a molded lens is acquired from the mold, the molded lens undergoes predetermined processes such as an annealing process as the need arises, thereby completing the manufacture of the lens.

As described above, the optical glass according to the embodiment includes predetermined amounts of the above-mentioned components. Therefore, it is possible to decrease the deformation temperature (and the glass transition temperature) while securing a high refractive index and a low dispersivity. Specifically, for example, the refractive index nd at the d-line can be set to be more than 1.83, the Abbe number vd can be set to be more than 37, and the glass transition temperature Tg can be set to be 640° C. or less. Furthermore, even when press molding is performed at a temperature close to the deformation temperature Ts of the glass, it is possible to easily avoid devitrification (so-called low temperature devitrification) caused in the press molding. Further, although not containing gadolinium oxide ($Gd_2O_3$) having a high price, the optical glass includes $Al_2O_3$. Thereby, structure is stabilized, and thus defects in appearance such as fogging at the time of molding and the like hardly occur. Further, if $Sb_2O_3$ is added, it is possible to avoid coloring which causes inconvenience in practice and to prevent foam from being mixed. Further, the optical glass does not include $TiO_2$ which is added as a component generally used to increase a refractive index, and thus it is possible to avoid coloring.

Accordingly, by using the optical glass, it is possible to manufacture more effectively a molded lens having favorable optical characteristics. Furthermore, it is possible to reduce the heat load applied to the mold used in press molding of the optical glass. Therefore, this is advantageous in an increase in lifetime of the mold. Furthermore, the optical glass does not include environmental toxins such as arsenic (As), lead (Pb), and tellurium (Te). Hence, this is preferable from the viewpoint of environment preservation.

EXAMPLES

Next, specific examples of the optical glass according to the embodiment of the invention will be described.

Table 1 shows components, which constitute the optical glass according to an example of the invention, and contents (wt %) of the components (Examples 1 to 10).

All the optical glasses according to Examples 1 to 10 include predetermined contents of $SiO_2$, $B_2O_3$, $Al_2O_3$, ZnO, $La_2O_3$, $Y_2O_3$, $Ta_2O_5$, and $Li_2O$ as shown below.
  $SiO_2$: 1 wt % or more and 5 wt % or less
  $B_2O_3$: 15 wt % or more and 24 wt % or less
  $Al_2O_3$: 0.1 wt % or more and 3 wt % or less
  ZnO: 1 wt % or more and 14 wt % or less
  $La_2O_3$: 35 wt % or more and 45 wt % or less
  $Y_2O_3$: 5 wt % or more and 10 wt % or less
  $Ta_2O_5$: 5 wt % or more and 13 wt % or less
  $Li_2O$: 0.5 wt % or more and 3 wt % or less Furthermore, the optical glasses according to Examples 1 to 8 and 10 include at least one of $ZrO_2$, $Nb_2O_5$, $WO_3$, $Na_2O$, $K_2O$, and $Sb_2O_3$. The contents of the components are as follows.
  $ZrO_2$: 0 wt % or more and 10 wt % or less
  $Nb_2O_5$: 0 wt % or more and 10 wt % or less
  $WO_3$: 0 wt % or more and 5 wt % or less
  $Na_2O$: 0 wt % or more and 3 wt % or less
  $K_2O$: 0 wt % or more and 3 wt % or less
  $Sb_2O_3$: 0 wt % or more and 1 wt % or less Further, the optical glasses according to Examples 1 to 10 include 1 wt % or less of $Sb_2O_3$. Furthermore, the contents of the components in the examples shown in Table 1 are represented by numerical values calculated when the total weight of all the components except for $Sb_2O_3$ is assumed as 100%.

Further, in Examples 1 to 6 and 10, all the optical glasses satisfy the above-mentioned Conditional Expression (1).

Table 1 shows various characteristic values in the optical glasses according to Examples 1 to 10. Specifically, Table 1 shows the refractive indices nd and the Abbe numbers vd at the d-line, the glass transition temperatures Tg (° C.), and the deformation temperatures Ts (° C.) of the optical glasses according to Examples 1 to 10.

As Comparative Example 1, an optical glass in which a content of $B_2O_3$ is out of the predetermined range was manu-

TABLE 1

| COMPONENT | UNIT | EXAMPLE | | | | | | | | | |
|---|---|---|---|---|---|---|---|---|---|---|---|
| | | 1 | 2 | 3 | 4 | 5 | 6 | 7 | 8 | 9 | 10 |
| $SiO_2$ | wt % | 3.0 | 1.0 | 5.0 | 2.0 | 2.0 | 2.0 | 3.0 | 2.0 | 2.0 | 1.0 |
| $B_2O_3$ | wt % | 22.8 | 16.0 | 19.0 | 19.5 | 19.5 | 19.5 | 22.8 | 19.5 | 19.5 | 16.0 |
| $Al_2O_3$ | wt % | 0.2 | 3.0 | 0.5 | 0.5 | 0.5 | 0.5 | 0.2 | 0.5 | 0.5 | 3.0 |
| ZnO | wt % | 6.0 | 6.0 | 6.0 | 2.0 | 6.0 | 13.0 | 6.0 | 6.0 | 13.0 | 10.5 | 6.0 |
| $La_2O_3$ | wt % | 36.0 | 41.0 | 44.5 | 41.0 | 38.0 | 41.0 | 34.0 | 39.0 | 44.5 | 41.0 |
| $Y_2O_3$ | wt % | 7.0 | 10.0 | 5.0 | 6.0 | 8.0 | 6.0 | 7.0 | 8.0 | 9.5 | 10.0 |
| $Ta_2O_5$ | wt % | 5.0 | 9.0 | 9.0 | 13.0 | 8.0 | 10.0 | 5.5 | 7.5 | 12.5 | 9.0 |
| $Li_2O$ | wt % | 1.0 | 3.0 | 0.5 | 1.0 | 1.0 | 1.0 | 1.0 | 1.0 | 1.0 | 1.0 |
| $ZrO_2$ | wt % | 8.0 | 5.0 | 6.0 | 4.0 | — | 10.0 | 8.5 | — | — | 5.0 |
| $Nb_2O_5$ | wt % | 8.0 | 5.0 | 5.5 | 5.0 | 10.0 | — | 8.5 | 9.5 | — | 5.0 |
| $WO_3$ | wt % | 3.0 | 1.0 | 3.0 | 2.0 | — | 4.0 | 3.5 | — | — | 1.0 |
| $Na_2O$ | wt % | — | — | — | — | — | — | — | — | — | 1.0 |
| $K_2O$ | wt % | — | — | — | — | — | — | — | — | — | 1.0 |
| CONDITIONAL EXPRESSION (1) | wt % | 1.79 | 2.55 | 2.11 | 1.96 | 2.56 | 1.96 | 1.58 | 2.76 | 4.32 | 2.55 |
| TOTAL | wt % | 100.0 | 100.0 | 100.0 | 100.0 | 100.0 | 100.0 | 100.0 | 100.0 | 100.0 | 100.0 |
| $Sb_2O_3$ | wt % | 0.2 | 0.9 | 0.3 | 0.5 | 0.1 | 0.7 | 0.2 | 0.1 | 0.2 | 0.2 |
| nd | — | 1.842 | 1.843 | 1.842 | 1.851 | 1.843 | 1.852 | 1.847 | 1.832 | 1.841 | 1.840 |
| vd | — | 40.3 | 40.6 | 40.2 | 40.6 | 40.5 | 40.2 | 37.5 | 40.6 | 42.0 | 40.4 |
| Tg | ° C. | 605 | 511 | 636 | 603 | 591 | 576 | 608 | 593 | 595 | 508 |
| Ts | ° C. | 662 | 565 | 697 | 660 | 641 | 633 | 665 | 635 | 649 | 561 | factured. In addition, as Comparative Example 2, an optical glass which does not include $Al_2O_3$ as an essential component of the embodiment of the invention was manufactured. Table 2 shows components and characteristic values according to Comparative Examples 1 and 2.

TABLE 2

| COMPONENT | UNIT | COMPARATIVE EXAMPLE 1 | COMPARATIVE EXAMPLE 2 |
|---|---|---|---|
| $SiO_2$ | wt % | 1.0 | 2.5 |
| $B_2O_3$ | wt % | 14.0 | 19.5 |
| $Al_2O_3$ | wt % | 5.0 | — |
| ZnO | wt % | 6.0 | 6.0 |
| $La_2O_3$ | wt % | 41.0 | 41.0 |
| $Y_2O_3$ | wt % | 10.0 | 6.0 |
| $Ta_2O_5$ | wt % | 9.0 | 13.0 |
| $Li_2O$ | wt % | 3.0 | 1.0 |
| $ZrO_2$ | wt % | 5.0 | 4.0 |
| $Nb_2O_5$ | wt % | 5.0 | 5.0 |
| $WO_3$ | wt % | 1.0 | 2.0 |
| $Na_2O$ | wt % | — | — |
| $K_2O$ | wt % | — | — |
| CONDITIONAL EXPRESSION (1) | wt % | 2.55 | 1.96 |
| TOTAL | wt % | 100.0 | 100.0 |
| $Sb_2O_3$ | wt % | 0.2 | 0.2 |
| nd | — | DEVITRIFIED | DEVITRIFIED |
| vd | — | | |
| Tg | ° C. | | |
| Ts | ° C. | | |

As can be understood clearly from the numerical data shown in Table 1, in Examples 1 to 10, a high refractive index nd more than 1.83, a high Abbe number vd more than 37, and a glass transition temperature Tg less than 640° C. were obtained. Moreover, devitrification did not occur. On the other hand, in all Comparative Examples 1 and 2 shown in Table 2, devitrification occurred.

From the results, it can be seen that the optical glasses having the components according to Examples are excellent in practical use in that balance of the refractive index nd, the Abbe number vd, and the glass transition temperature Tg are excellent and devitrification is hardly caused in processing. Consequently, it can be figured out that the optical glasses according to Examples can be press-molded with high precision at a relatively low temperature and are suitable as constituent materials of a lens having a higher optical performance.

As described above, the invention is described with reference to the embodiments and the examples, but the invention is not limited to the embodiments and examples, and may be modified in various forms. For example, the components of the optical glass are not limited to the values shown in the above-mentioned examples, and may have different characteristic values.

What is claimed is:

1. An optical glass comprising, by weight:
    1% or more and 5% or less of silicon oxide ($SiO_2$);
    15% or more and 24% or less of boron oxide ($B_2O_3$);
    0.1% or more and 3% or less of aluminum oxide ($Al_2O_3$);
    1% or more and 14% or less of zinc oxide (ZnO);
    35% or more and 45% or less of lanthanum oxide ($La_2O_3$);
    5% or more and 10% or less of yttrium oxide ($Y_2O_3$);
    5% or more and 13% or less of tantalum oxide ($Ta_2O_5$); and
    0.5% or more and 3% or less of lithium oxide ($Li_2O$).

2. The optical glass according to claim 1, further comprising:
    at least one of zirconium oxide ($ZrO_2$), niobium oxide ($Nb_2O_5$), tungsten oxide ($WO_3$), sodium oxide ($Na_2O$), potassium oxide ($K_2O$), and antimony oxide ($Sb_2O_3$).

3. The optical glass according to claim 2,
    wherein a content of the zirconium oxide is 0% by weight or more and 10% by weight or less,
    wherein a content of the niobium oxide is 0% by weight or more and 10% by weight or less,
    wherein a content of the tungsten oxide is 0% by weight or more and 5% by weight or less,
    wherein a content of the sodium oxide is 0% by weight or more and 3% by weight or less,
    wherein a content of the potassium oxide is 0% by weight or more and 3% by weight or less, and
    wherein a content of the antimony oxide is 0% by weight or more and 1% by weight or less.

4. The optical glass according to claim 2,
    wherein the following Conditional Expression (1) is satisfied:

$$1.7 < A/B < 2.6 \qquad (1)$$

where
    A denotes a total content (% by weight) of the lanthanum oxide and the yttrium oxide, and
    B denotes a total content (% by weight) of the zirconium oxide, the niobium oxide, the tantalum oxide and the tungsten oxide.

5. The optical glass according to claim 3,
    wherein the following Conditional Expression (1) is satisfied:

$$1.7 < A/B < 2.6 \qquad (1)$$

where
    A denotes a total content (% by weight) of the lanthanum oxide and the yttrium oxide, and
    B denotes a total content (% by weight) of the zirconium oxide, the niobium oxide, the tantalum oxide and the tungsten oxide.

* * * * *